(12) United States Patent
Mitchell et al.

(10) Patent No.: US 6,944,622 B1
(45) Date of Patent: Sep. 13, 2005

(54) USER INTERFACE FOR AUTOMATED PROJECT MANAGEMENT

(75) Inventors: Todd Anthony Mitchell, Rochester, MN (US); Andrew T. Tanabe, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/488,738

(22) Filed: Jan. 20, 2000

(51) Int. Cl.[7] ............................................. G06F 17/30
(52) U.S. Cl. ..................... 707/102; 707/104.1; 707/101
(58) Field of Search ............................... 705/9, 14, 42; 707/508, 516, 517, 3, 4, 101, 12, 102, 104.1; 345/764, 765

(56) References Cited

U.S. PATENT DOCUMENTS

| | | | |
|---|---|---|---|
| 5,019,961 A * | 5/1991 | Addesso et al. | |
| 5,530,861 A * | 6/1996 | Diamant et al. | |
| 5,765,140 A * | 6/1998 | Knudson et al. | |
| 6,092,048 A * | 7/2000 | Nakaoka | 705/9 |
| 6,101,481 A * | 8/2000 | Miller | 705/9 |
| 6,154,753 A * | 11/2000 | McFarland | 707/508 |
| 6,169,991 B1 * | 1/2001 | Tsukahara | 707/102 |
| 6,237,915 B1 * | 5/2001 | Ledet et al. | 273/236 |
| 6,381,610 B1 * | 4/2002 | Gundewar et al. | |
| 6,487,469 B1 * | 11/2002 | Formenti | 705/11 |

OTHER PUBLICATIONS

Takkinen et al. Task-oriented restructuring of an application domain: a m architecture for doing things in Internet e-mail, System Sciences. Jan. 5-8, 1999. pp. 6.*

Miller Leslie. A heterogenous multiprocessor design and the distributed scheduling of its task group workload. International conference on Computer Architecture. 1982, 283-290.*

* cited by examiner

Primary Examiner—Jean M. Corrielus
Assistant Examiner—Baoquoc N. To
(74) Attorney, Agent, or Firm—Roy W. Truelson

(57) ABSTRACT

A process manager supports the interactive definition of multiple user groups having access to process application software, and for each group, the interactive definition of a respective group interface which is unique to the group. Preferably, the group interface is a project tracking notepad which lists tasks applicable to the group, and functions as both a selection menu and a status indicator or reminder of actions to be performed or which have been performed. The project tracking notepad is an alternative user interface, which exists in addition to any other user interfaces available. Preferably, an administrator defines, for each group, the task selections applicable to the group, and the task description which will display on project tracking notepad. Thus it is possible to describe the same task with different descriptive words or phrases when the task selection is displayed in the notepads of different groups. Each task selection displayed in a project tracking notepad contains a respective status indicator, which is preferably a colored light. The process management function described herein provides diverse groups of users with easy-to-understand project menus which are specific to the group, do not include superfluous task selections, and use descriptive terminology meaningful to the group. Furthermore, such project menus are easily customizable and editable by a process administrator or similar user.

18 Claims, 14 Drawing Sheets

USER INTERFACE FOR AUTOMATED PROJECT MANAGEMENT

FIELD OF THE INVENTION

The present invention relates to digital data processing, and in particular, to computer methods and systems for management of projects involving multiple computer users.

BACKGROUND OF THE INVENTION

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

Early computer systems were very expensive and difficult to use, capable of being programmed and manipulated by only a handful of highly-educated specialists. The cost of operating such computers was correspondingly high, and they were therefore used for only the most essential tasks. The dynamic which has driven the information revolution is the sustained reduction in the cost of computing. Thus, information which was too expensive to gather, store and process a few years ago, is now economically feasible to manipulate via computer. The reduced cost of information processing drives increasing productivity in a snowballing effect, because product designs, manufacturing processes, resource scheduling, administrative chores, and many other factors, are made more efficient.

The cost of information processing not only includes the cost of computer hardware and software, but perhaps even more significantly, the cost of human resources devoted to gathering and processing information using computer systems. Improvements to the usability of computer hardware and software reduce the cost of human resources associated with information processing, either by reducing the amount of time directly devoted to a particular task by a human operator (user), or by reducing the level of training required of a user in order to achieve proficiency in performing the task. Continued progress of the information revolution requires still further improvements to the usability of computer systems.

Graphical user interfaces (GUIs) have become standard user interfaces for a variety of software applications. Among the standard features of such GUIs are selectable icons for performing an action, toolbars and the like which offer selections to the user, and pull-down menus which offer still further selections. A common characteristic of all these is that the user may select one action from among multiple actions offered using a pointing-device or similar input, without having to type in the name of an action. In theory, this frees the user from the need to remember commands or other selection identifiers.

Generic GUI interfaces are adequate for many applications where the number of tasks that a user must perform are few and the type of application is limited in scope. However, where complexity increases, even the "prompting" provided by GUI interfaces can be inadequate. This is particularly true in the case of processes which involve contributions from a set of multiple individuals, where each individual or group of individuals in the set supports a different part of the overall process. The set may be, for example, all the employees in a particular commercial enterprise, or, for a large enterprise, would more typically be a subset of the employees involved in some particular project or aspect of the company's business which shares common data.

Where different individuals in a set use common data to support some process or processes, there is a tendency to employ a software interface broad enough to cover all individuals in the set. Such a generic GUI will have toolbar, menu and other task selections sufficient to cover the requirements of all individuals. However, most if not all of the individual users use only a portion of the array of task selections available. Therefore, any particular user is typically presented with a large number of task selections which he does not use, although other users may need those selections. This makes the number of selections unduly large, and creates confusion and annoyance among the users. In order to reduce the apparent complexity, some software designers combine different but related task selections into a single generic selection, which may be followed by a menu of options. However, this also has possible adverse ramifications, as the users might have difficulty understanding the correct generic task designation required to reach the actions they want, and the requirement of an options menu can slow user input. Another problem encountered with such generic GUIs is that individual user groups within the set of users may have specialized vocabulary for identifying particular tasks, so that the generic language used to identify a task selection may be difficult for some users to understand.

It is possible to address the problems above mentioned by writing customized software applications for each group of users, or by writing a single customized software application which treats each user group differently and presents different user interfaces, involving different selections, to each group of users. Writing such customized software can consume enormous programming resources.

A need exists for an approach to software interfaces, especially software interfaces for diverse groups of users, which avoids the problems inherent in the prior art approaches.

SUMMARY OF THE INVENTION

In accordance with the present invention, a process management function supports the interactive definition of multiple user groups having access to process application software, and for each group, the interactive definition of a respective group interface which is unique to the individuals in that group.

In the preferred embodiment, the group interface is a project tracking notepad which lists tasks applicable to the group. The project tracking notepad functions as a selection menu, from which a user in the applicable group may select actions, and further functions as a status indicator or reminder of actions to be performed or which have been performed. The project tracking notepad is simply an alternative user interface, which exists in addition to any other user interfaces available.

In the preferred embodiment, a process administrator or similar person defines, for each group, a list of task selections applicable to the group. For each task, the project administrator also defines a task description which will display on the applicable menu of task selections when a user from the group accesses the menu. Thus it is possible to describe the same task with different descriptive words or phrases when the task selection is displayed in the menus of different groups.

In the preferred embodiment, files or objects in a file system or database are associated with projects. The process administrator may further identify a scope of a task, meaning that a task may have a project scope (to be applicable to all files or objects associated with the project) or may have an object scope (to be applicable only to files or objects selected by the user).

In the preferred embodiment, each task selection displayed in a project tracking notepad contains a respective indicator, which indicates task status. In particular, the indicator is preferably a colored light, in which white indicates that the task is available for next selection, yellow indicates that the task is in progress, green indicates successful task completion, and red indicates that an abnormal condition or error has occurred, and gray indicates a task which has not yet been made available for selection.

The exemplary embodiment is a process management application for managing diverse groups of workers involved in the translation of files from one national language to another.

The process management function described herein provides diverse groups of users with easy-to-understand project menus which are specific to the group, do not include superfluous task selections, and use descriptive terminology meaningful to the group. Furthermore, such project menus are easily customizable and editable by a process administrator or similar user.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
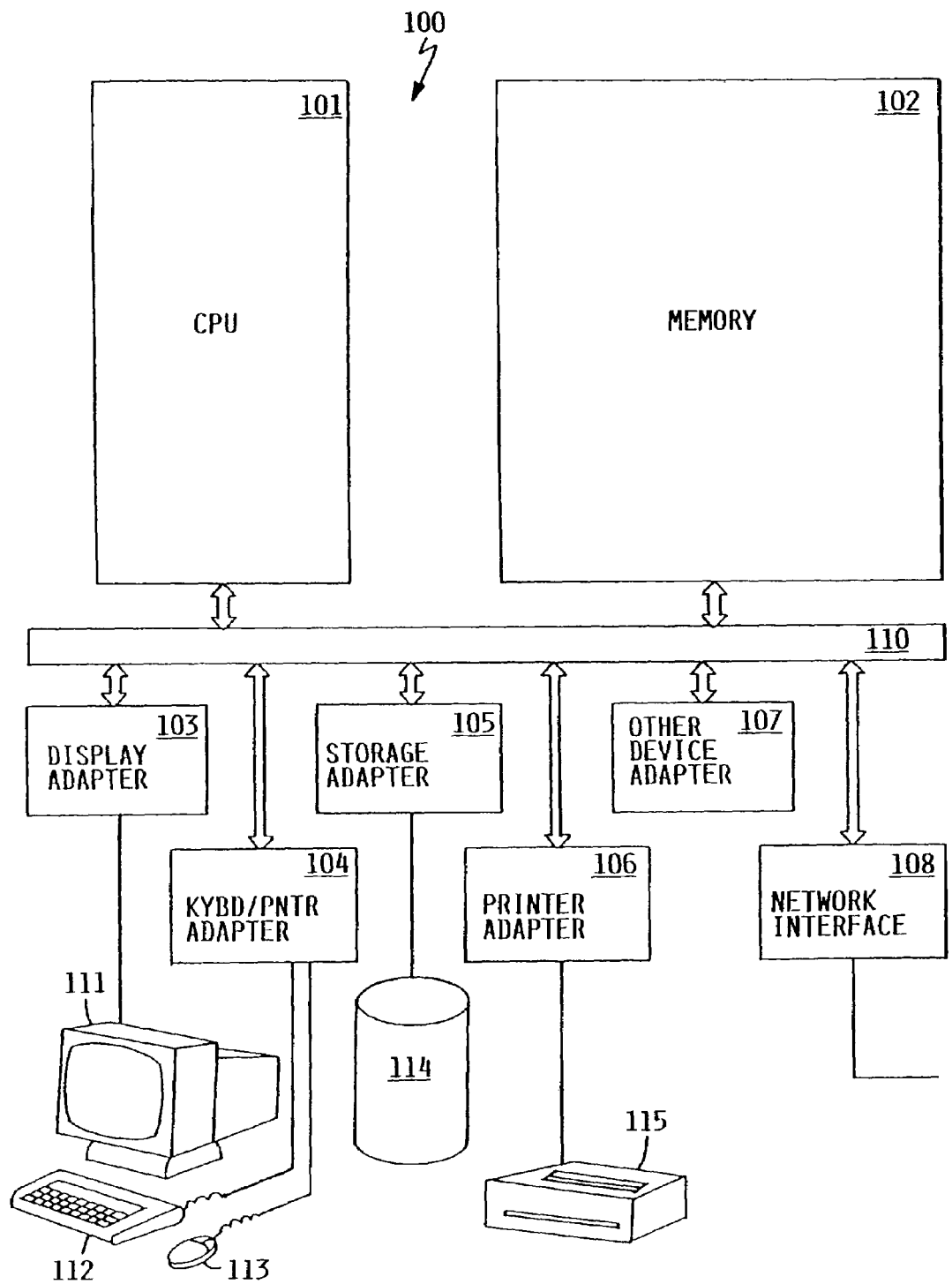
FIG. 1 is a high-level block diagram of a client workstation computer system for performing process tasks, according to the preferred embodiment of the present invention.

Referring to the Drawing, wherein like numbers denote like parts throughout the several views, FIG. 1 is a high-level block diagram of a typical client workstation computer system 100, from which process tasks are performed by a user, according to the preferred embodiment. Client workstation computer system 100 includes CPU 101, main memory 102, various device adapters and interfaces 103–108, and communications bus 110. CPU 101 is a general-purpose programmable processor, executing instructions stored in memory 102; while a single CPU is shown in FIG. 1, it should be understood that computer systems having multiple CPUs could be used. Memory 102 is a random-access semiconductor memory for storing data and programs; memory is shown conceptually as a single monolithic entity, it being understood that memory is often arranged in a hierarchy of caches and other memory devices. Communications bus 110 supports transfer of data, commands and other information between different devices; while shown in simplified form as a single bus, it may be structured as multiple buses, and may be arranged in a hierarchical form. Display adapter 103 supports video display 111, which is typically a cathode-ray tube display, although other display technologies may be used. Keyboard/pointer adapter 104 supports keyboard 112 and pointing device 113, depicted as a mouse, it being understood that other forms of input devices could be used. Storage adapter 105 supports one or more data storage devices 114, which are typically rotating magnetic hard disk drives, although other data storage devices could be used. Printer adapter 106 supports printer 115. Adapter 107 may support any of a variety of additional devices, such as CD-ROM drives, audio devices, etc. Server interface 108 provides a physical interface to a server computer system, the server providing access to common data used by a group of users. In the preferred embodiment, the server interface is through a local area network, such as an Ethernet or Token Ring network. However, many other types of interface are possible. For example, the interface may be a mainframe terminal channel interface, such as might be used to connect multiple workstations to a single larger mainframe computer acting as a server. Alternatively, the interface may be through a wide area network, such as the Internet. Computer system 100 will typically be any of various models of single-user computer systems known as "personal computers". The representation of FIG. 1 is intended as an exemplary simplified representation, it being understood that many variations in system configuration are possible in addition to those mentioned here. Furthermore, a client workstation for performing certain process related tasks in accordance with the present invention need not be a personal computer system, and may be a so-called dumb terminal attached to a mainframe, a notebook or laptop computer, a special-purpose device, or any of various hardware variations.

Figure 2:
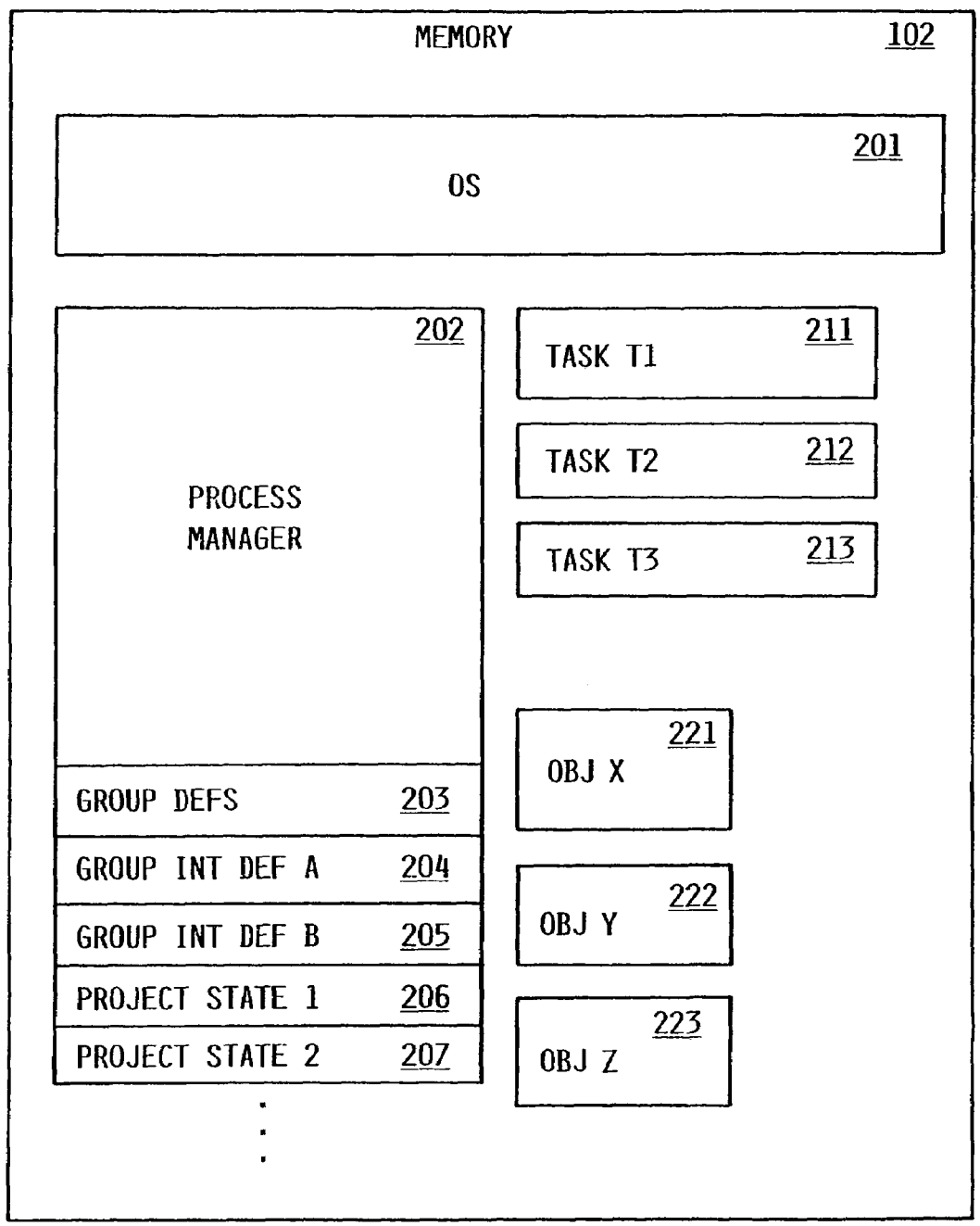
FIG. 2 is a conceptual illustration of the major software components of the client workstation computer system, according to the preferred embodiment.

FIG. 2 is a conceptual illustration of the major software components of client workstation system 100 in memory 102. Operating system 201 provides various low-level software functions, such as device interfaces, management of memory pages, management of windowing interfaces, management of multiple tasks, etc. as is well-known in the art. In the preferred embodiment, operating system 201 is a Microsoft Windows NT™ operating system, it being understood that other operating systems could be used. Process manager application software 202 provides an interactive user interface for managing multiple projects, as more fully explained herein. Process manager uses a group definition file 203, one or more group interface definition files 204–205, and one or more project state files 206–207. While each group interface definition and project state file contains different data, for ease of reference these are referred to generically herein by the reference numbers 204 (group interface definition file) and 206 (project state file). Process manager may invoke any of several process task applications 211–213. These tasks may be performed entirely on client workstation 100, or may require remote calls to another computer system such as a server system. Memory 102 may also contain object or files 221–223, upon which some task or tasks are performed. Typically, objects 221–223 in client system 100 are copies of objects in a central file repository, which are transferred from the central repository to client workstation for processing. When processing is complete, these files, if changed, may be returned to the central repository.

While a certain number of object, tasks, and other entities are shown, it will be understood that these are shown for purposes of illustration only, and that the actual number of such entities may vary. Additionally, while the software components of FIG. 2 are shown conceptually as residing in memory, it will be understood that in general the memory of a computer system will be too small to hold all programs and data simultaneously, and that information is typically stored in data storage 104, comprising one or more mass storage devices such as rotating magnetic disk drives, and that the information is paged into memory by the operating system as required.

Figure 3:
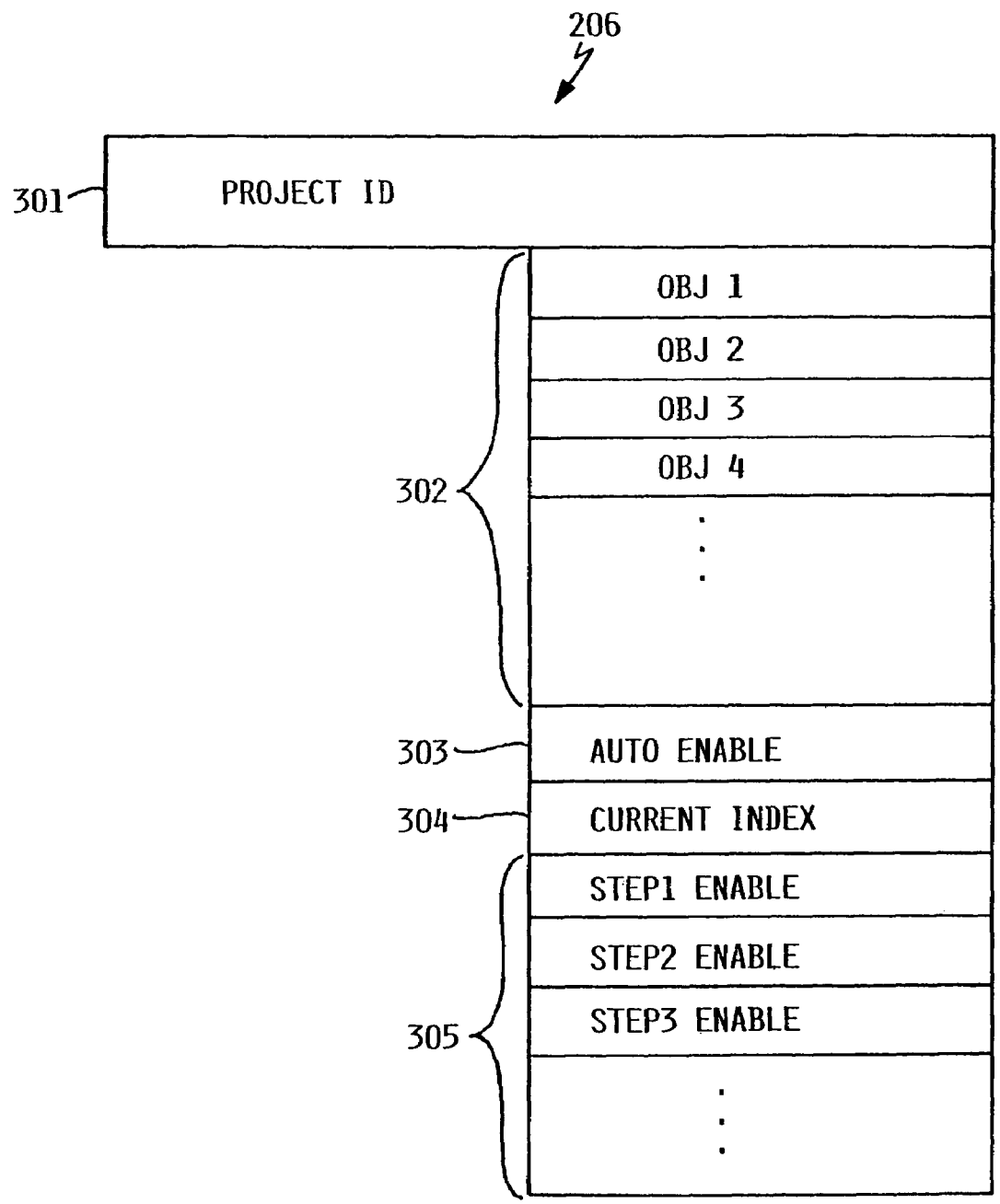
FIG. 3 represents the information contained in a project state file, according to the preferred embodiment.

FIG. 3 represents some of the information contained in a project state file 206, according to the preferred embodiment. A "project" is simply an arbitrary defined unit of work to be performed by the user groups with respect to some collection of objects. For example, a project may be the processing of all objects supporting a new product to be introduced by the company for which the users work. A separate project state file exists for each project. As shown in FIG. 3, project state file 206 contains a project identifier 301, a listing of objects applicable to the project 302, an automatic step flag 303, a current index task number 304, and a task enable flag array 305. Project identifier 301 is a unique identifying name, number or similar designator for the project. Project object list 302 is a listing of all object which must be processed as part of the project. Automatic step flag 303 is a flag field which indicates whether each step in sequence is to be invoked automatically. If step flag 303 is enabled, each next sequential task (step) in the series of tasks defined for the process manager (i.e., tasks invoked by the users to complete a project) is automatically invoked upon successful completion of the previous step, unless the next step is not enabled, in which case automatic processing stops and awaits manual intervention. Current index field 304 is a number representing the furthest successfully completed task in the series of tasks defined for the process. Task enable flag array 305 is an array of enable/disable flags, one flag corresponding to each task in the series of tasks defined for the process. A flag in array 305 set to enable means that the corresponding task should be performed as part of the project; a flag set to disable means that the corresponding task may be omitted. Project state file 206 may contain additional tracking information not shown, which is not necessary to an understanding of the present invention.

Figure 4:
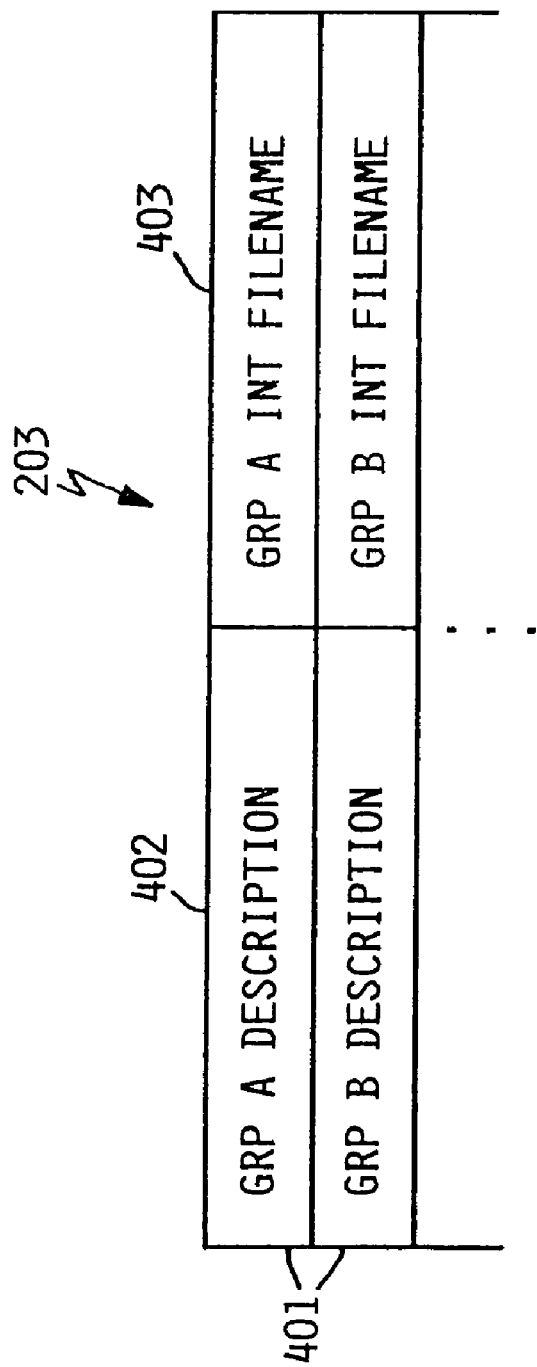
FIG. 4 represents the contents of the group definition file, according to the preferred embodiment.

FIG. 4 represents the contents of the group definition file 203. Process manager 202 uses a single group definition file 203, which defines all groups. As shown in FIG. 4, group definition file 203 contains a listing of group entries 401, each group entry 401 containing a group description 402 and an interface filename 403. Group description 402 is simply a descriptive name of the group that is displayed to the user. Interface filename 403 is the name of the group interface definition file 204 which contains the project tracking interface description for the group.

Figure 5:
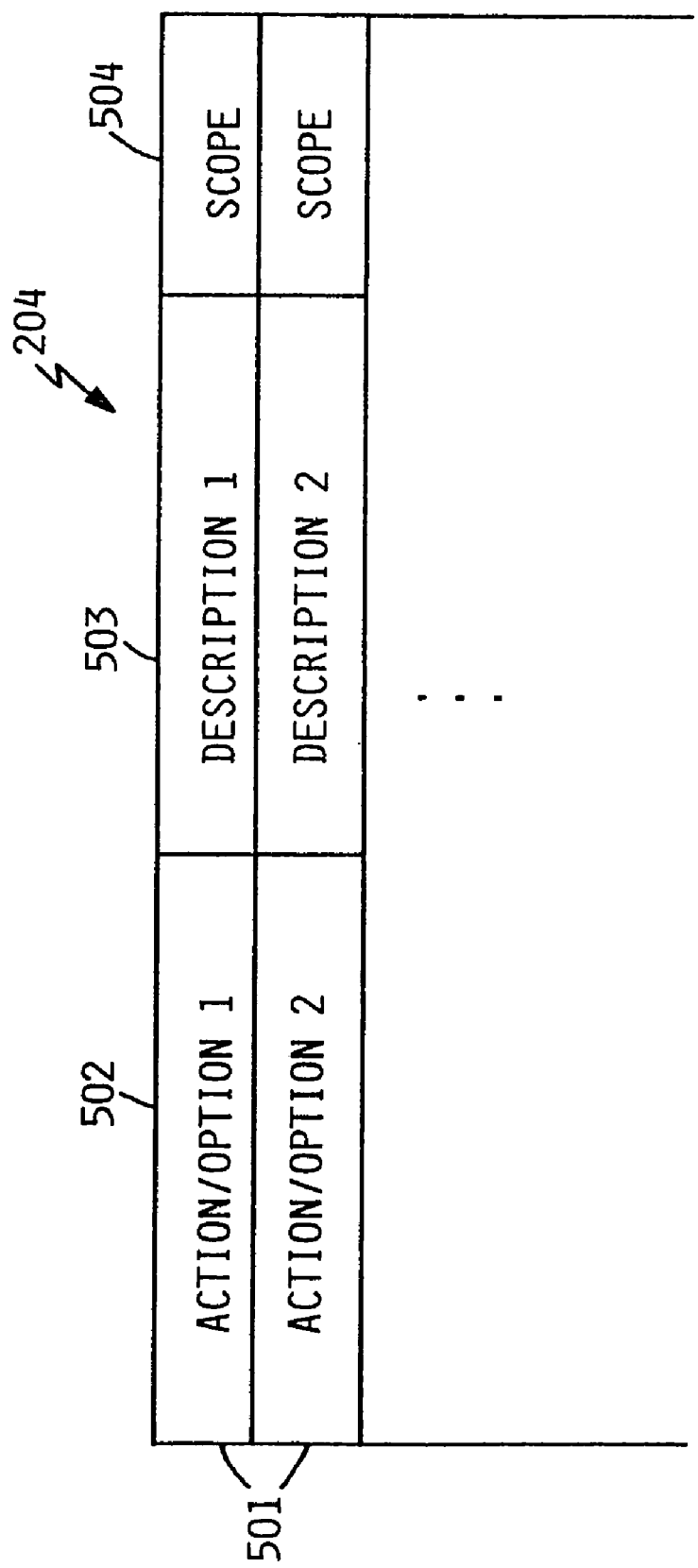
FIG. 5 represents the contents of the group interface definition file, according to the preferred embodiment.

FIG. 5 represents the contents of a group interface definition file 204. The group interface definition file defines those actions, capable of being invoked from process manager 202, which are applicable to some particular group. These actions will be listed in the project tracking notepad applicable to the group (herein described), which is part of the user interface. As shown in FIG. 5, group interface definition contains a listing of action entries 501, each action entry 501 containing an action definition 502, and action description 503, and a scope 504. The action definition 502 defines the action in terms of some generic action which can be invoked by process manager 202. Usually (although not always), the generic action will be followed by one or more options, to define a more specific form of the generic action which is usually performed by users in the applicable group. In other words, it would be possible for users in the group (or, for that matter, for any other user having access to process manager 202) to perform the identical action by selecting the specified generic action from a toolbar, pulldown menu, or other means, and then selecting the specified option(s) which are then displayed (e.g., on a pop-up menu of option). Action description 503 contains a descriptive name for the action/option(s), which is displayed to the user in the project tracking notepad. Scope 504 indicates the scope of the action when invoked, i.e., whether the action applies to all objects associated with a particular project (all objects in the project object list 302), or only to selected objects, which requires that the user select one or more objects when invoking the action.

Figure 6:
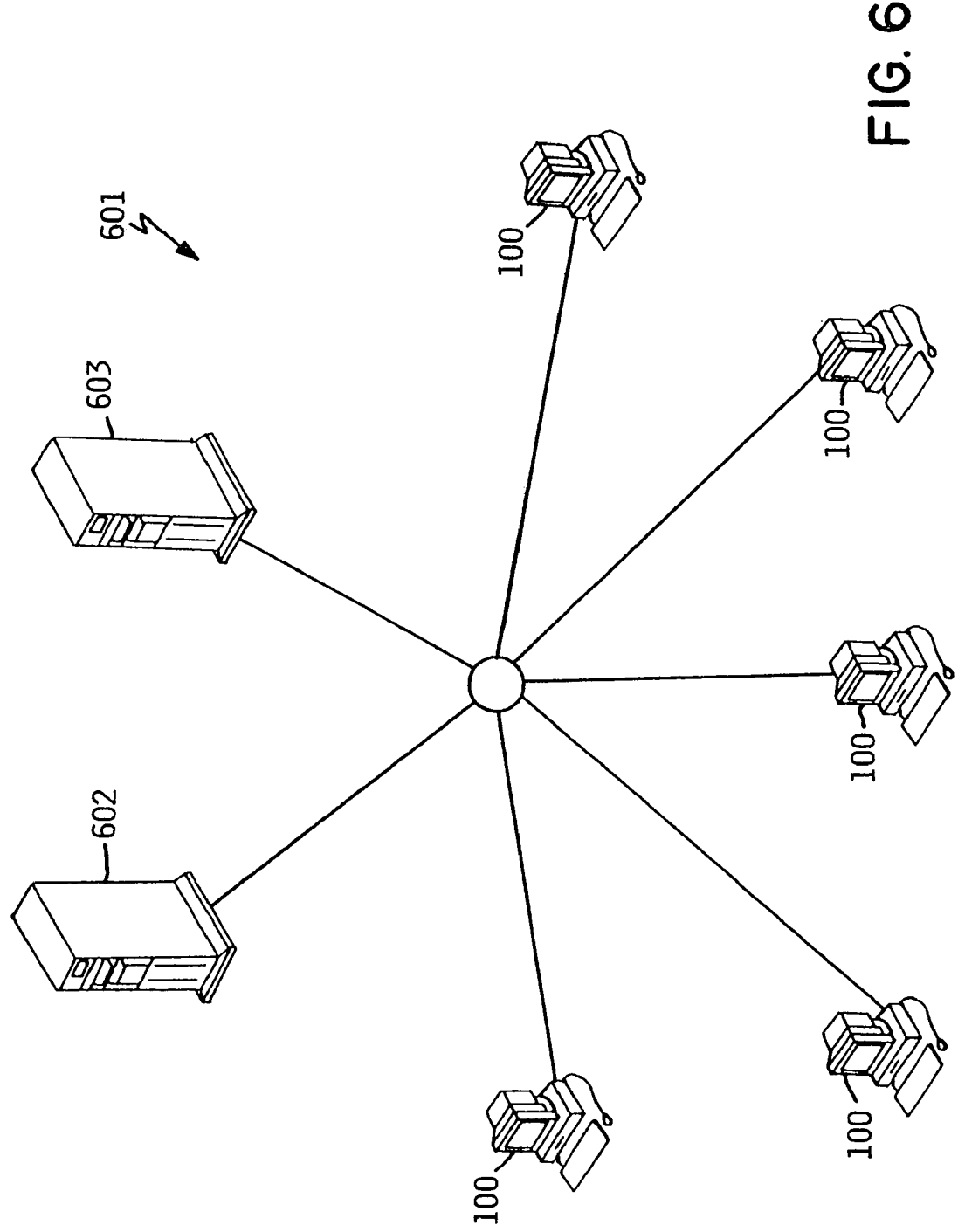
FIG. 6 is a conceptual illustration of the network environment in which a workstation operates, according to the preferred embodiment.

FIG. 6 is a conceptual illustration of the network environment 601 in which workstation 100 operates. As shown in FIG. 6, multiple user workstations 100 are connected via a communications medium to a central file server 602 and a task server 603. Each workstation has its own copy of process manager software 202, group definition file 203, group interface definition files 204–205, project state files 206–207, and any necessary task applications 211–213. Typically, each user workstation 100 is used by a single individual, e.g., on a desktop in an office or cubicle. However, it would be possible for users to share workstations. Objects 221–223 are normally stored on central file server 602, which acts as an object library. Objects 221–223 may be copied from the library by requesting a copy of the file from central file server 602, edited on a workstation 100, and returned to the central file server 602 after editing. Central file server 602 is responsible for any locking or similar mechanisms required for maintaining file integrity among the multiple users, as is known in the art. Task server 603 is a computer system dedicated to performing one or more tasks at the request of a workstation acting as a client. In the preferred embodiment, the primary task performed by task server 603 is machine translation of objects. The communications medium may be, e.g., a Token Ring, an Ethernet, or other, as may be typical in a local area network, or may be a wide area network communications medium, including wireless communications media. Additionally, the network may be a host mainframe computer which is attached through channels to multiple workstations. It will be understood that the network of FIG. 6 is a simplified conceptual illustration, and that in practice networks may encompass hundreds or thousands of workstations, may have multiple servers, and may have very complex topologies.

In the preferred embodiment, process manager application software 202 support a process involving multiple tasks 211–213 being performed with respect to multiple objects 221–223 by multiple groups of users, each group of users contributing something to the process. Because each group's functions are different, each group uses a different set of tasks, and may use some of the same tasks in different ways. Process manager 202 provides various conventional interfaces for invoking tasks, displaying status, and the like. In addition, process manager 202 provides the capability to interactively define multiple user groups, and to interactively define, for each group, a respective unique user interface called a project tracking notepad.

The project tracking notepad is a window which lists tasks applicable to the group. The project tracking notepad has several functions. It lists all tasks applicable to the group, so that a user is in a very simple and straightforward manner reminded of the tasks which should be performed. It may be used as a selection menu, from which a user in the applicable group may select actions (tasks to be performed) by using any appropriate display pointing device 113 to select the displayed text description corresponding to an action. It further serves as a status indicator, indicating which task have already been performed and which tasks remain to be performed.

The operation of the process manager 202 in an exemplary application of the preferred embodiment of the present invention will now be described. For ease of understanding, FIGS. 7–12 depict various interactive windows which are presented to the user on display 112 by the process manager 202. In this exemplary application, the process management application is used to support translation of files associated with computer applications from a source national language (in this case, English) to any of various target national languages (e.g., French, German, Italian, Spanish, etc.). This file translation activity is performed by three user groups: the Development Lab, Central File Management, and the Translation Centers.

The development lab personnel perform the following tasks. They gather all appropriate files for the complete package to be translated. They check that all files build correctly in English, i.e., they compile, link, etc. without error into a form ready for customer shipment. If the source is to be transformed into output formats after translation, this is also verified in English. The files are then sent to Central File Management for further processing. A project could consist of a few files to several thousand files.

Central File Management (CFM) unpacks files, adds information to the project, and runs specific checks on each project to ensure that no errors were introduced during transmission. For some projects, CFM may run additional checks to see if prior-translated information can be re-used. Afer processing is complete, CFM repackages the project and stores it in a central repository for use by Translation Centers.

The Translation Centers receive the projects processed by CFM. A Translation Center coordinator, who is associated with a project, adds information to the project, such as the coordinator's name and tracking information. The coordinator determines whether any part of the source data is suitable for machine translation, and if so, send the source files to a task server 603 which performs machine translation. The coordinator performs a word count of the files, and creates jobs for human-assisted translation used a Translation Manager tool. After translation, the coordinator performs a final word count. Files for document production will be formatted using the appropriate formatting tools. The fully translated and formatted files are packaged again and returned to the Development Lab or a manufacturing facility.

Figure 7:
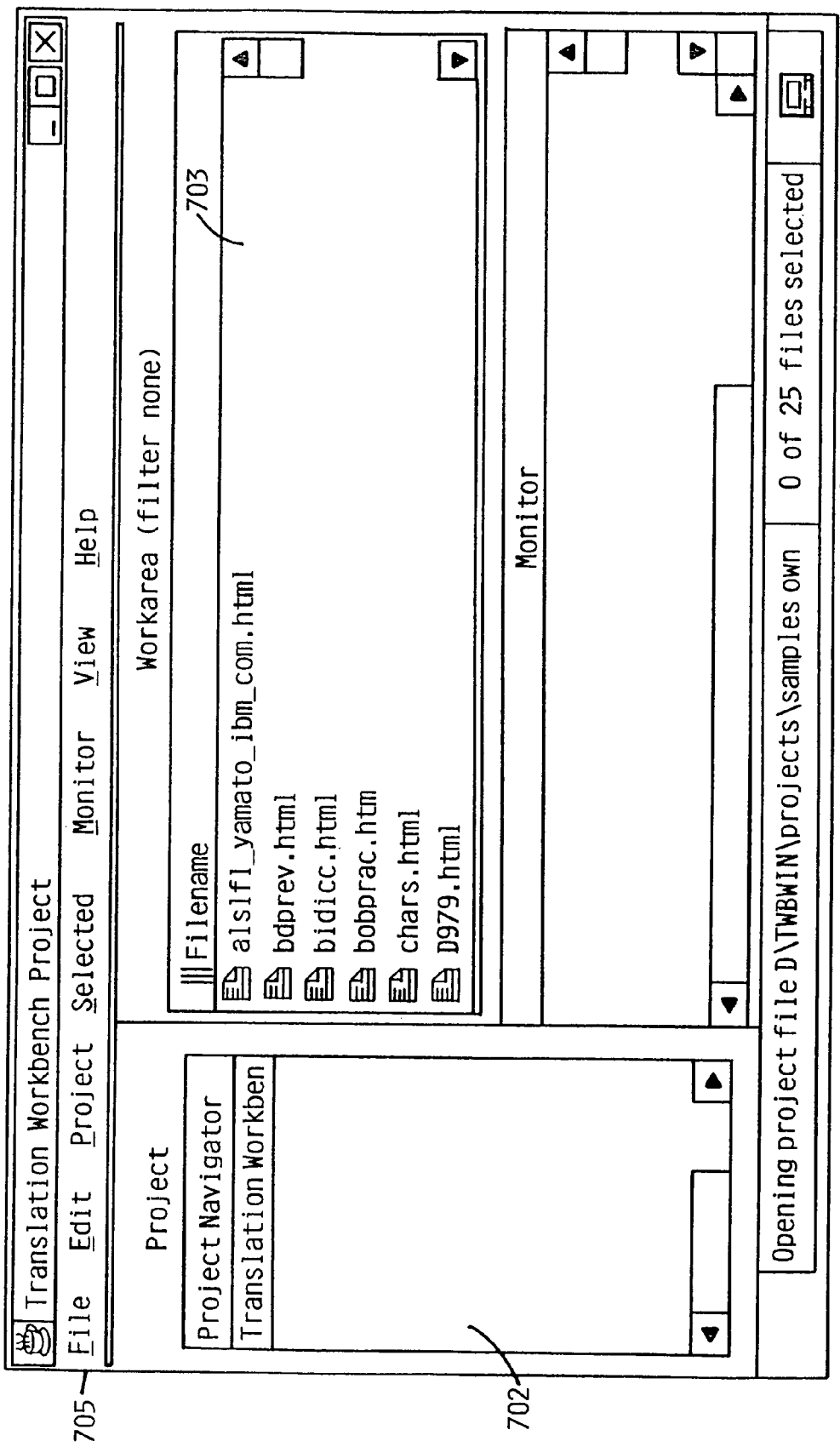
FIG. 7 shows a main menu interactive window which is displayed to the user upon opening the process management application, according to the preferred embodiment.

FIG. 7 shows a main menu interactive window 701 which is displayed to the user upon opening the process management application. As shown, the main menu contains various conventional interactive features, such as frames 702, 703, menu bar 705, buttons, scroll bars, etc., as are known in the art. The user may select a project from project frame 702 at left. In this example, the project "Translation Workbench" is selected. Selection of a project causes objects (files) associated with the project to be displayed in workarea frame 703. From menu bar 705 the user may select any of various actions to perform.

Figure 8:
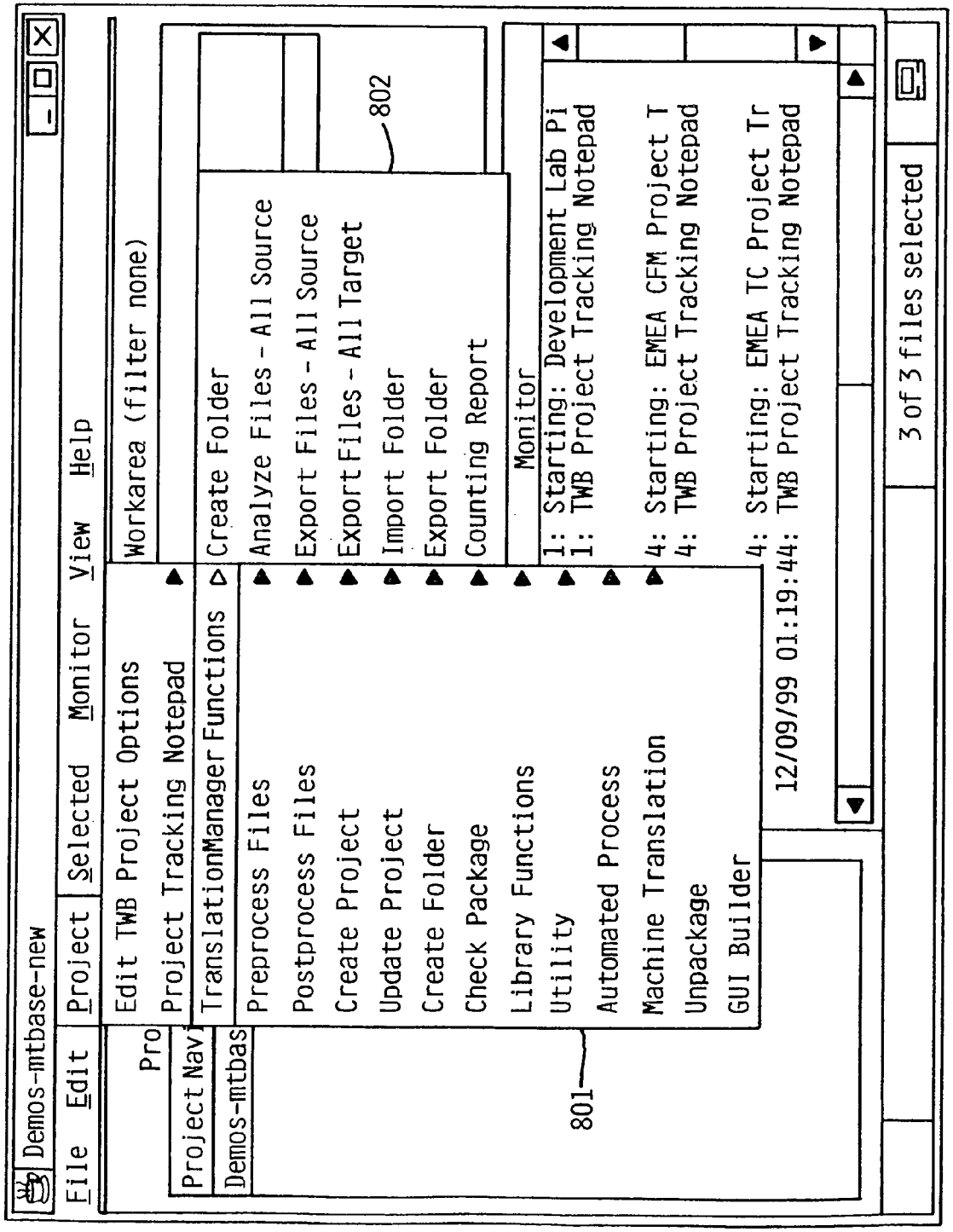
FIG. 8 shows an example of pull-down menu selections from the main interactive menu of the process manager, according to the preferred embodiment.

If "Project" is selected from menu bar 705, a pull-down menu 801 appears containing additional action selections, as shown in FIG. 8. Some of these selections contain small arrows at right, indicating that additional choices can be viewed by moving pointing device 113 so that the text is highlighted. FIG. 8 illustrates the "TranslationManager Functions" text highlighted, with additional choices shown in the menu 802 to the right.

One of the choices in pull-down menu 801 is "Project Tracking Notepad". A user wishing to bring up the interactive project tracking notepad as described herein moves the pointing device 113 so that the "Project Tracking Notepad" text is highlighted, causing an additional menu of choices (not shown) to appear immediately to the right of the arrow, similar to the manner in which menu 802 appears. This additional menu contains a listing of all defined user groups; process manager obtains the information necessary to build the additional menu from group definition file 203. The user then selects the appropriate user group to bring up the project tracking notepad for his or her group.

At this point it will be observed that the user must select the correct user group from the menu in order to associate the user with a group, and to bring up the project tracking notepad corresponding to the group. In the preferred embodiment, there is nothing to prevent a user from selecting a project tracking notepad for another user group. It would alternatively be possible to associate users with groups by configuring each user's process manager 202 so that this selection step is unnecessary, and the correct project tracking notepad appears automatically upon selecting "Project Tracking Notepad" from menu 801. This could be accomplished by any of various means, i.e., a profile file containing user group information could be added to the files associated with each user's process manager 202.

Figure 9:
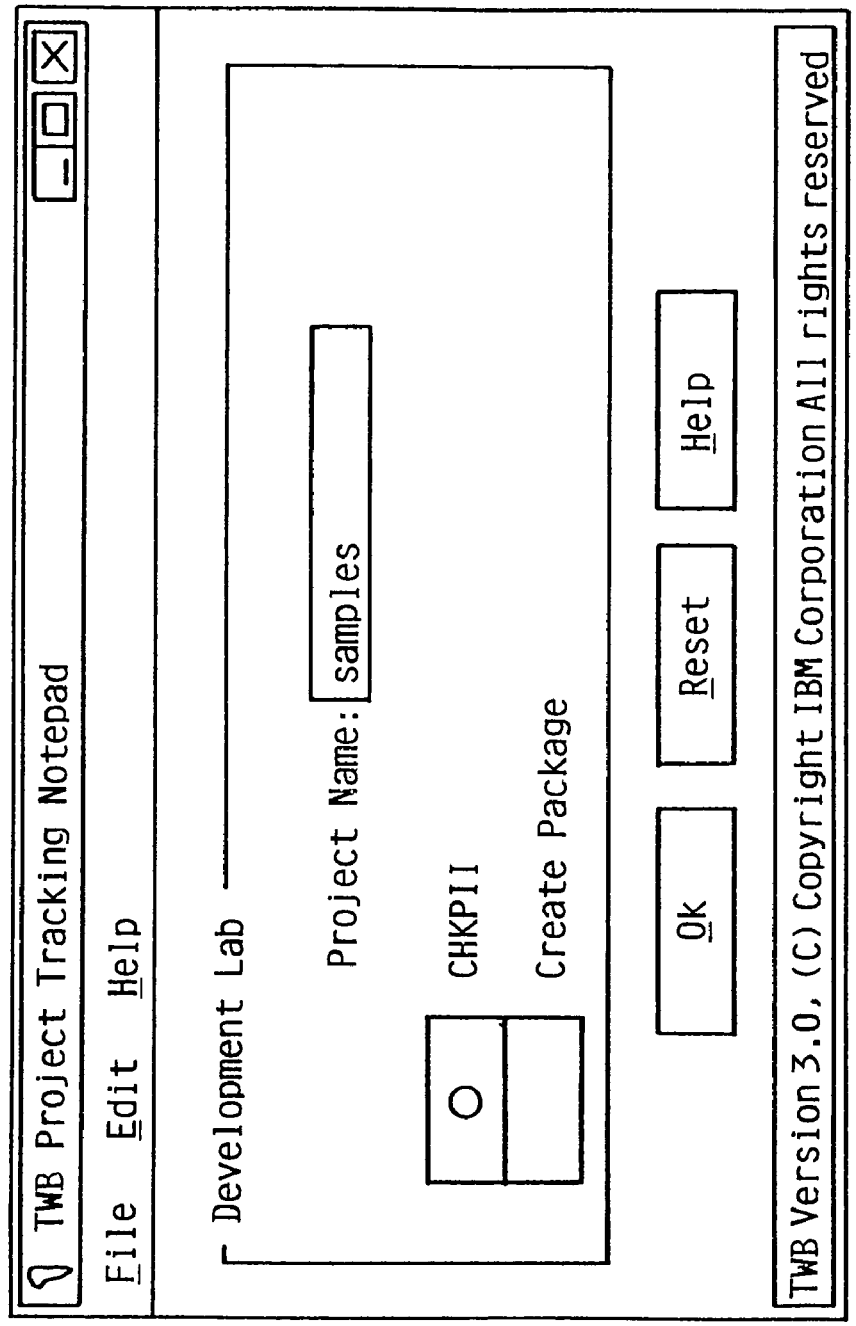
FIGS. 9–11 show different interactive project tracking notepad windows for the three different user groups of the exemplary embodiment, FIG. 9 showing a project tracking notepad for the development lab, FIG. 10 showing a project tracking notepad for central file management, and FIG. 11 showing a project tracking notepad for the translation center.
Figure 10:
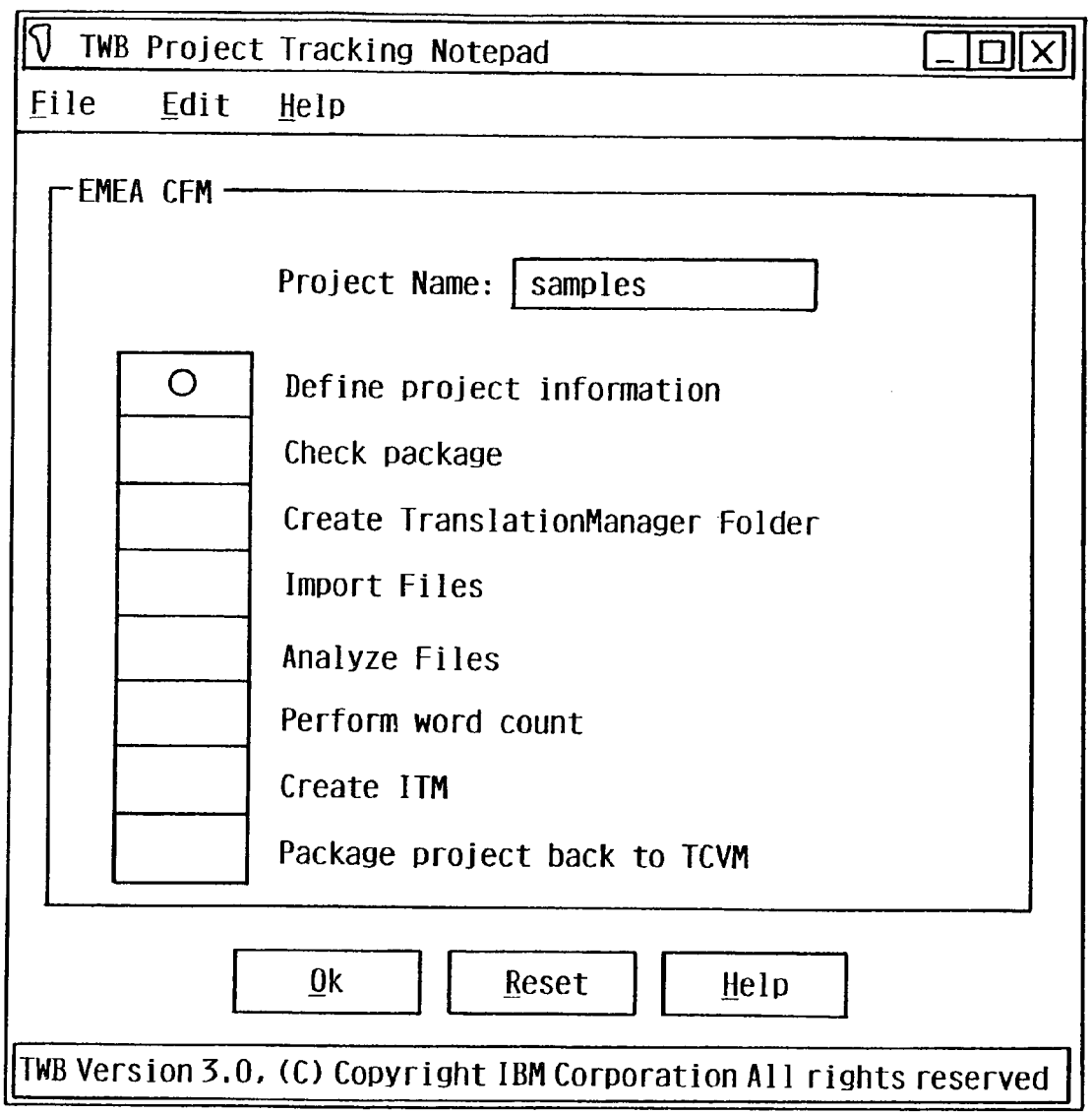
Figure 11:
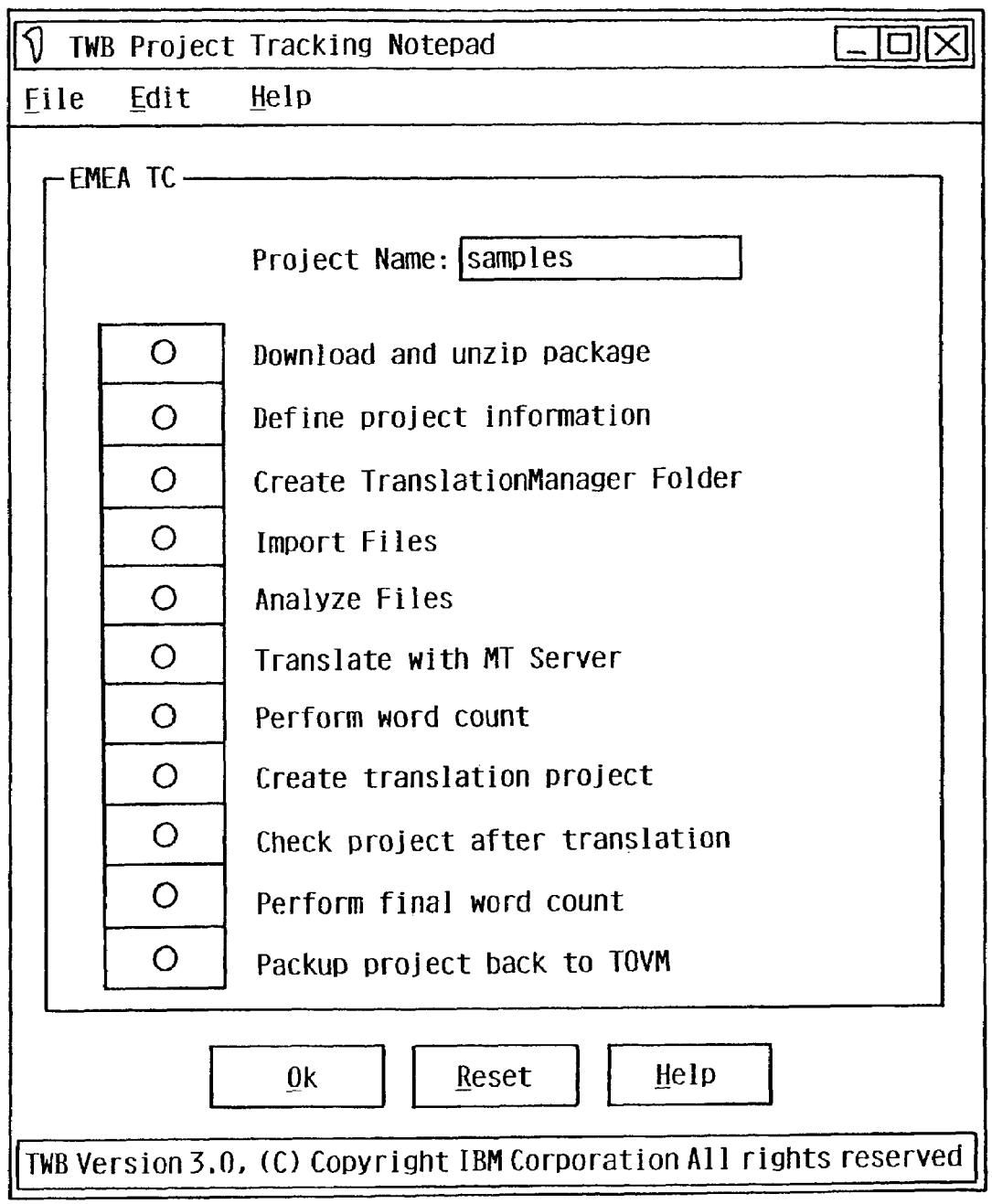

FIGS. 9–11 show different interactive project tracking notepad windows which are presented to the user upon selecting a project tracking notepad and user group from menu 801. The three project tracking notepads shown in FIGS. 9–11 correspond to the three user groups described above with respect to the exemplary embodiment. FIG. 9 shows a project tracking notepad 901 for the development lab; FIG. 10 shows a project tracking notepad 1001 for central file management; and FIG. 11 shows a project tracking notepad 1101 for the translation center.

As can be seen, all three project tracking notepads 901, 1001, 1101 follow a common format. Near the upper left portion of the notepad is a the descriptive name of the user group, which process manager 202 obtains from descriptive name field 402 of group definition file 203. Beneath the user group name and to the right is displayed the name of the project that the user has selected (from main menu 701). There follows a listing of actions which are applicable to the respective user group. Not surprisingly, the number and type of actions listed varies considerably from one project tracking notepad to another.

Each listed action has a status button at the left and a description at the right. The description to be displayed for a particular action is contained in description field 503 of the applicable group interface definition file 204. The status button is a color-coded button indicating status, wherein: white indicates that the corresponding action is active, i.e., is available for selection, but has not yet been selected by the user; green indicates that the corresponding action has successfully completed; yellow indicates that the corresponding action is in progress; red indicates that an abnormal condition or error occurred when executing the corresponding action (the action may be selected again when the condition is corrected); and gray indicates that the corresponding action is either disabled using the enable flag array 305 as described below, or is not yet available for selection. In the application of the preferred embodiment, all actions must be performed in sequence, so at most one button is white at any given time, all subsequent enabled actions being not yet available for selection, and therefore gray. The textual description of an action which is enabled but not yet available for selection appears black, just as any other enabled action, while the text of an action which is disabled appears shaded or gray. It should be understood, however, that this is simply one exemplary embodiment, and that in alternative embodiments it would be possible to activate more than one button for selection at a time, or to permit selection in different sequences or in arbitrary sequences.

Project state file 206 maintains the state of task completion for a particular project. In particular, current index 304 contains the index number of the last successfully completed action. In this embodiment, it is assumed that process tasks are performed in a sequential fashion, so an index number of "3" indicates that tasks 1 through 3 inclusive have successfully completed. Therefore, if a user leaves the project tracking notepad window, or even leaves the process manager, the state is saved and it is not necessary to re-execute these tasks. If, through some error or other unusual condition, a user wishes to re-execute tasks which have already successfully completed, the user can select the "Reset" button near the bottom of the project tracking notepad to reset the value of current index 304.

Project state file 206 contains additional information used by process manager 202 in managing the interactive project tracking notepad. Enable flag array 305 contains an enable/disable flag corresponding to each action offered in a project tracking notepad. If the flag is set to enable, the corresponding action displayed normally (as shown in FIGS. 9–11) in the appropriate project tracking notepad and can be selected by the user for execution, and status is displayed as described above. If the flag is set to disable, the action is displayed in the project tracking notepad using a broken or shaded font (not shown), which gives a lighter (grayed) appearance. This indicates to the user that the action may not be selected. Clicking on the corresponding text with a cursor pointing device will produce no action. Additionally, auto enable flag 303 in project state file 206 indicates whether sequential actions in the project tracking notepad are to be performed automatically. If this flag is set, the next sequential action in the project tracking notepad is automatically invoked upon successful completion of the preceding action, assuming that the next sequential action's enable flag in flag array 305 is set to enable.

Edit function from the menu bar of project tracking notepad 901, 1001, 1101 can be used to edit fields 303, 304 and 305 of the project state file. Specifically, the Edit function can be used to set or reset auto enable flag 303, to set the current index 304 to any arbitrary value, or to set or reset any flag in the task enable flag array 305.

Preferably, user groups and the project tracking notepad associated with each group are interactively defined by a process administrator or similar person, to assure consistency of interfaces. However, with the available easy-to-use project tracking notepad editor interface, these definitions can be made or altered by almost anyone, including the individual users. This flexibility enables easy creation and alteration of custom project tracking notepads. While in the exemplary embodiment, user groups typically comprise multiple users, there is no reason a user group can't be a single user, and for some processes it may be preferable that each individual user define his or her own project tracking notepad interface.

Figure 12:
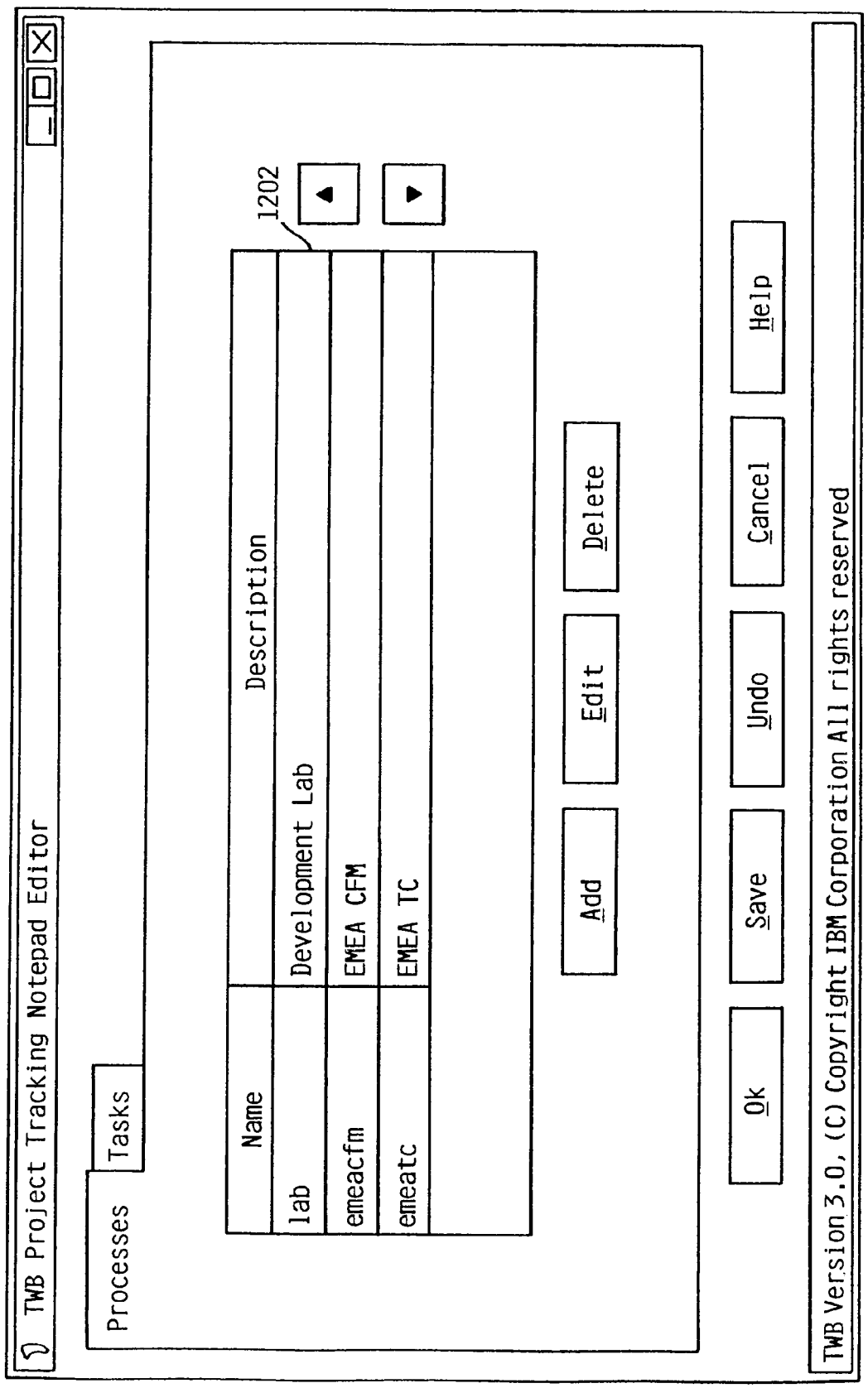
FIGS. 12 and 13 show different functions of the interactive project tracking notepad editor window of the exemplary embodiment, FIG. 12 showing the "Processes" function for editing group definitions, and FIG. 13 showing the "Tasks" function for editing group interface definitions.
Figure 13:
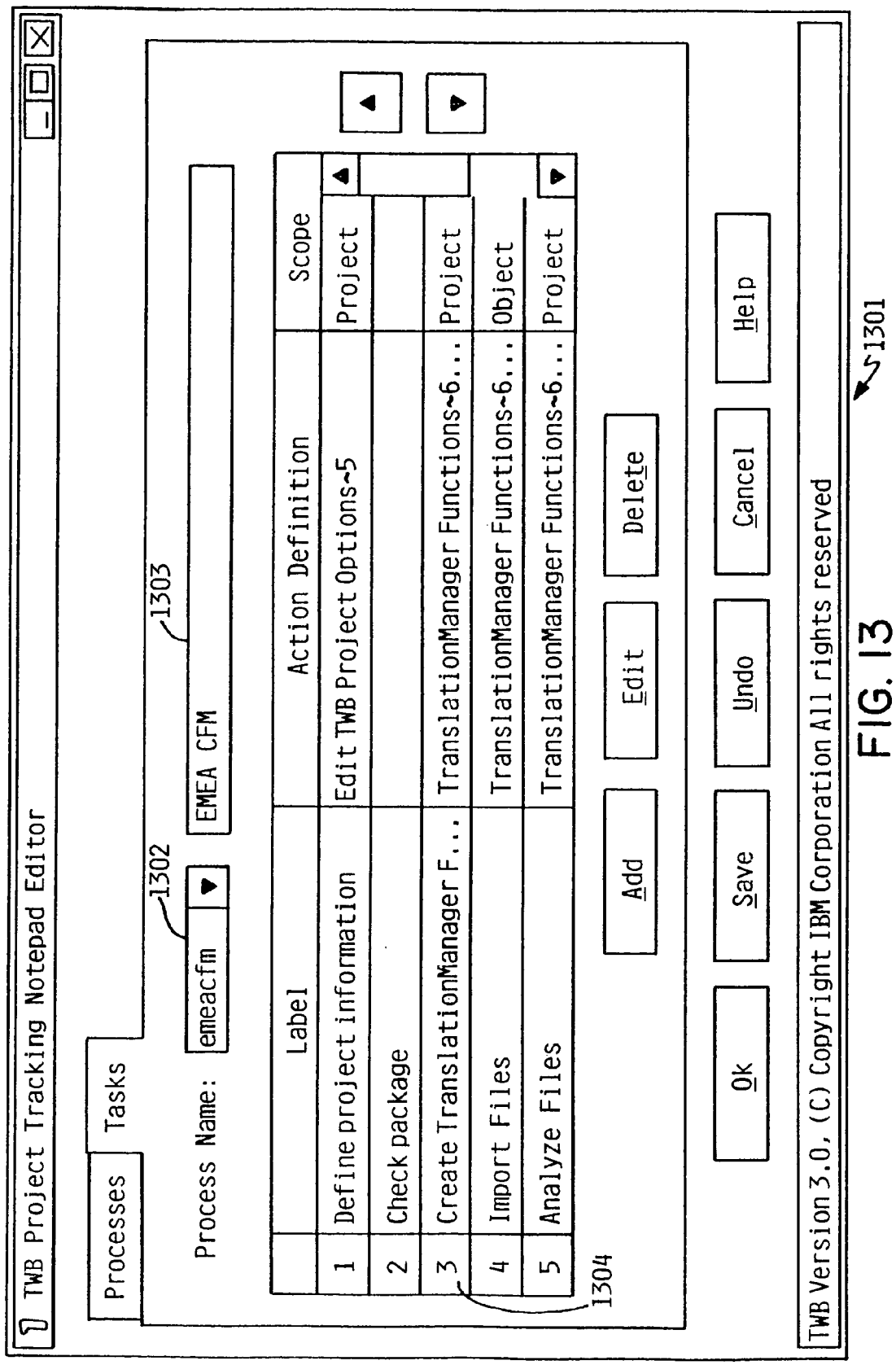

FIGS. 12 and 13 show the interactive project tracking notepad editor window. This window offers the user two functions selectable by the tabs, a "Processes" tab (illustrated in FIG. 12) and a "Tasks" tab (illustrated in FIG. 13). Processes function 1201 shown in FIG. 12 allows a user to interactively edit group definitions file 203. As shown in FIG. 12, a group definitions file 203 for the exemplary embodiment is displayed for editing in the editable window portion 1202 of process function screen 1201. "Name" column contains group interface filename field 403, while "Description" column contains group description field 402. The user can add, edit or delete entries in the group definition file by selecting the appropriate displayed button, and by typing the edited text in the appropriate field.

FIG. 13 shows the "Tasks" function screen, which is used to edit a group interface definition file 204. The user group for which the interface file is to be edited is selected using selection window 1302, and the description for this user group then appears in window 1303. Editable window 1304 then displays the contents of the group interface definition file 204 corresponding to the selected user group. The "Label" column corresponds to description field 503, the "Action Definition" column corresponds to actions field 502, and the "Scope" column corresponds to scope field 504. The user can add, edit or delete entries in the group interface definition file by selecting the appropriate displayed button, and by typing the edited text in the appropriate field.

In either case of interactively editing the group definitions file 203 or the group interface definition file 204, the edited file is saved by the user when finished editing, and the files are used to construct the various project tracking notepads, as described herein.

Figure 14:
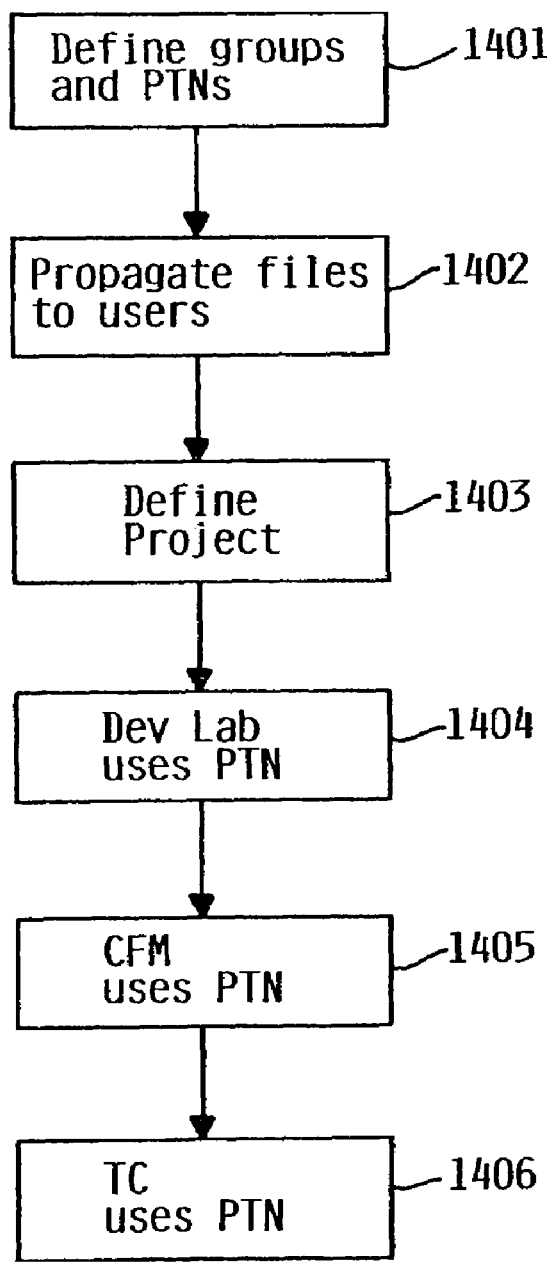
FIG. 14 is a high-level summary of steps of an example process, according to the preferred embodiment.

The entire process managed by process manager 202, for an example project A, is summarized at a high level in FIG. 14. A process administrator initially defines the user groups and project tracking notepad content for each group (step 1401). The group definitions file 203 and group interface definition files are 204–205 are propagated to the users (step 1402). A process administrator creates a project state file 206 for project A (step 1403). One or more development lab users obtain the project state file 206 from file server 602 and select the development lab project tracking notepad 901 to interactively perform tasks from the menu for project A (step 1404). One or more central file management personnel obtain the project state file 206 and select the CFM project tracking notepad 1001 to interactively perform tasks from the menu for project A (step 1405). One or more translation center personnel obtain the project state file 206 and select the TC project tracking notepad 1101 to interactively perform tasks from the menu for project A (step 1406). It will be understood that steps 1401 and 1402 are typically performed only once, or very infrequently, while the remaining steps are performed again for each new project.

It will be understood that the project tracking notepad is intended to guide the user along the most frequently used path or paths of a process, and does not necessarily cover every conceivable contingency or exception that may occur in process management. Theoretically, a process administrator could define multiple additional project tracking notepads to cover unusual conditions, although at some point it is to be expected that there will be diminishing returns from such additional definitions, and it may even cause more user confusion that it is worth. The standard user interfaces remain available to take actions appropriate to exceptional circumstances.

In the preferred embodiment described above, processing is done in a distributed manner, with each user having a copy of the process manager software 202 on his or her own workstation, and the objects being maintained in a central file server. However, it will be appreciated that the present invention could be implemented in many different multi-user computing environments. For example, the invention could be implemented in a mainframe based computing environment, in which multiple interactive user terminals (which may or may not be "intelligent" workstations) are attached to a host computer system. In such cases, process manager 202 and associated files may reside in the host computer system, or may reside in the user terminals, or some functions may be in the host, while others are in the user terminals. Alternatively, the computing environment could employ the client-server model, in which some or all of the process manager functions are performed, and associated files maintained, on one or more server computer systems. Additionally, the Internet or a similar wide area network could be used to connect user workstations with a server computer system. Many additional variations in hardware and network configuration, or in allocation of function between user workstations and central hosts or servers, are possible, and the present invention should not be construed to be limited to any particular client-server or host-terminal architecture.

In general, the routines executed to implement the illustrated embodiments of the invention, whether implemented as part of an operating system or a specific application, program, object, module or sequence of instructions are referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. Examples of signal-bearing media is illustrated in FIG. 1 as data storage device 114 or as memory 102.

Although a specific embodiment of the invention has been disclosed along with certain alternatives, it will be recognized by those skilled in the art that additional variations in form and detail may be made within the scope of the following claims:

What is claimed is:

1. A method for managing a project requiring a plurality of tasks performed on at least one computer system by a plurality of users, said at least one computer system containing a process interface supporting a pre-defined set of task actions performed by said at least one computer system with respect to data objects stored on said at least one computer system, the method comprising the steps of:

interactively defining a plurality of groups of users associated with the project;

interactively generating, for each of said plurality of groups of users, a respective project tracking interface definition, each project tracking interface definition being a data object defining a respective set of task selections, each task selection of a set of task selections corresponding to a respective task action of said pre-defined set of task actions performed by said at least one computer system with respect to a respective one or more said data objects stored on said at least one computer system, wherein a first set of task selections of a first project tracking interface for a first group of users is different from a second set of task selections of a second project tracking interface for a second group of users;

associating a first user with said first group of users;

presenting said first project tracking interface having said first set of task selections to said first user;

performing task actions corresponding to task selections of said first set of task selections responsive to said first user interactively selecting the corresponding task selections of said first set of task selections;

associating a second user with said second group of users;

presenting said second project tracking interface having said second set of task selections to said second user; and performing task actions corresponding to task selections of said second set of task selections responsive to said second user interactively selecting the corresponding task selections of said second set of task selections.

2. The method of claim 1, wherein each said project tracking interface definition comprises a respective task description, whereby a task selection for a first project tracking interface may have a first task description, and the same task selection for a second project tracking interface may have a second task description different from said first task description.

3. The method of claim 1, wherein each task selection displayed in a project tracking interface includes a task status indicator.

4. The method of claim 3, wherein said task status indicator is assumes one of a plurality of colors, each color corresponding to a respective status.

5. The method of claim 1, wherein each said project tracking interface definition is an interface definition file containing entries corresponding to tasks, wherein a first interface definition file for defining said first project tracking interface contains a respective entry for each task selection in said first set of task selections, and a second interface definition file for defining said second project tracking interface contains a respective entry for each task selection in said second set of task selections.

6. The method of claim 5, wherein each said entry in an interface definition file includes a respective task description field, whereby a task selection for said first project tracking interface may have a first task description, and the same task selection for said second project tracking interface may have a second task description different from said first task description.

7. The method of claim 5, wherein each said entry in an interface definition file includes a respective scope field specifying the scope of the task selection, whereby a task selection for said first project tracking interface may have a first scope, and the same task selection for said second project tracking interface may have a second scope different from said first scope.

8. A computer program product for managing a project requiring a plurality of tasks performed on at least one computer system by a plurality of users, said at least one computer system containing a process interface supporting a pre-defined set of task actions performed by said at least one computer system with respect to data objects stored on said at least one computer system, said computer program product comprising:
a plurality of processor executable instructions recorded on signal-bearing media, wherein said instructions, when executed by at least one processor, cause at least one computer to perform the steps of:
receiving interactive input defining a plurality of groups of users associated with the project;
receiving interactive input generating, for each of said plurality of groups of users, a respective project tracking interface definition, each project tracking interface definition being a data object defining a respective set of task selections, each task selection of a set of task selections corresponding to a respective task action of said pre-defined set of task actions performed by said at least one computer system with respect to one or more said data objects stored on said at least one computer system, wherein a first set of task selections of a first project tracking interface for a first group of users is different from a second set of task selections of a second project tracking interface for a second group of users;
associating a first user with said first group of users;
presenting said first project tracking interface having said first set of task selections to said first user;
invoking task actions corresponding to task selections of said first set of task selections responsive to receiving interactive input from said first user selecting the corresponding task selections of said first set of task selections;
associating a second user with said second group of users;
presenting said second project tracking interface having said second set of task selections to said second user; and
invoking task actions corresponding to task selections of said second set of task selections responsive to receiving interactive input from said second user selecting the corresponding task selections of said second set of task selections.

9. The program product of claim 8, wherein each said project tracking interface definition comprises a respective task description, whereby a task selection for a first project tracking interface may have a first task description, and the same task selection for a second project tracking interface may have a second task description different from said first task description.

10. The program product of claim 8, wherein each task selection displayed in a project tracking interface includes a task status indicator.

11. The program product of claim 10, wherein said task status indicator is assumes one of a plurality of colors, each color corresponding to a respective status.

12. The program product of claim 8, wherein each said project tracking interface definition is an interface definition file, said interface definition files containing entries corresponding to tasks, wherein a first interface definition file for defining said first project tracking interface contains a respective entry for each task selection in said first set of task selections, and a second interface definition file for defining said second project tracking interface contains a respective entry for each task selection in said second set of task selections.

13. The program product of claim 12, wherein each said entry in an interface definition file includes a respective task description field, whereby a task selection for said first project tracking interface may have a first task description, and the same task selection for said second project tracking interface may have a second task description different from said first task description.

14. The program product of claim 13, wherein each said entry in an interface definition file includes a respective scope field specifying the scope of the task selection, whereby a task selection for said first project tracking interface may have a first scope, and the same task selection for said second project tracking interface may have a second scope different from said first scope.

15. A computer program product for managing a project requiring a plurality of tasks performed on at least one computer system by a plurality of users, said at least one computer system containing a process interface supporting a pre-defined set of task actions performed by said at least one computer system with respect to data objects stored on said at least one computer system, said computer program product comprising a plurality of processor executable instructions recorded on signal-bearing media, said instructions comprising:
an interface definition access function, said interface definition access function accessing a project tracking interface definition, said project tracking interface definition being one of a plurality of project tracking interface definitions, each said project tracking interface definition being associated with a respective group of users of said plurality of users, each project tracking interface definition being a data object defining a respective set of task selections, each task selection of a set of task selections corresponding to a respective task action of said predefined set of task actions, wherein a first set of task selections of said first project tracking interface definition for a first group of users is different from a second set of task selections of a second project tracking interface definition for a second group of users; and
a project tracking interface generator, said generator generating a project tracking interface defined by a project tracking interface definition of said plurality of project tracking interface definitions, said project tracking interface defined by a project tracking interface definition presenting a user with the set of task selections of the project interface definition and allowing the user to invoke task actions corresponding to respective task selections presented to the user by interactively selecting the corresponding respective task selections.

16. The computer program product for managing a project of claim 15, further comprising:

an interactive interface definition function, said interactive interface definition function interactively receiving and storing a plurality of said project tracking interface definitions, each project tracking interface definition being associated with a respective group of users of said plurality of users.

17. The method of claim 1, wherein each said project tracking interface definition includes a chronological ordering relationship among task selections of its respective set of task selections and at least one indicator indicating a next expected task selection in said chronological ordering relationship among task selections.

18. The program product of claim 8, wherein each said project tracking interface definition includes a chronological ordering relationship among task selections of its respective set of task selections and at least one indicator indicating a next expected task selection in said chronological ordering relationship among task selections.

* * * * *